United States Patent
Hathaway et al.

(10) Patent No.: US 9,747,400 B2
(45) Date of Patent: *Aug. 29, 2017

(54) OPTIMIZING PLACEMENT OF CIRCUIT RESOURCES USING A GLOBALLY ACCESSIBLE PLACEMENT MEMORY

(71) Applicant: International Business Machines Corporation, Armonk, NY (US)

(72) Inventors: David J. Hathaway, Underhill, VT (US); Nathaniel D. Hieter, Clinton Corners, NY (US); Shyam Ramji, Lagrangeville, NY (US); Alexander J. Suess, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,251

(22) Filed: Dec. 7, 2016

(65) Prior Publication Data

US 2017/0083642 A1 Mar. 23, 2017

Related U.S. Application Data

(63) Continuation of application No. 15/187,856, filed on Jun. 21, 2016, which is a continuation of application (Continued)

(51) Int. Cl.
*G06F 17/50* (2006.01)

(52) U.S. Cl.
CPC ........ *G06F 17/505* (2013.01); *G06F 17/5072* (2013.01); *G06F 17/5022* (2013.01); *G06F 2217/04* (2013.01)

(58) Field of Classification Search
CPC .............. G06F 17/505; G06F 17/5072; G06F 2217/04; G06F 17/5022
See application file for complete search history.

(56) References Cited

U.S. PATENT DOCUMENTS

| 5,495,419 A | 2/1996 | Rostoker et al. |
| 5,634,058 A | 5/1997 | Allen et al. |

(Continued)

OTHER PUBLICATIONS

Hathaway et al., "Optimizing Placement of Circuit Resources Using a Globally Accessible Placement Memory", U.S. Appl. No. 15/371,238, filed Dec. 7, 2016, 29 pages.

(Continued)

*Primary Examiner* — Naum B Levin
(74) *Attorney, Agent, or Firm* — Steven F. McDaniel (57) ABSTRACT

A method, executed by one or more processors, for optimizing placement of a logic network, includes partitioning a logic network into a set of logic partitions, launching a set of placement optimization threads that correspond to the logic partitions, and allocating memory that is accessible to the placement optimization threads to provide a globally accessible placement memory for reserving placement locations on the integrated circuit. Each placement optimization thread may be configured to conduct the operations of determining a desired location for a logic element, reserving a set of potential locations for the logic element, determining a best location from the set of potential locations, and placing the logic element to the best location. Each placement optimization thread may also be configured to release each of the potential locations that are not the best location. A corresponding computer program product and computer system are also disclosed herein.

1 Claim, 5 Drawing Sheets

Related U.S. Application Data

No. 15/010,214, filed on Jan. 29, 2016, now Pat. No. 9,418,188, which is a continuation of application No. 14/666,738, filed on Mar. 24, 2015, now Pat. No. 9,436,791.

(56) References Cited

U.S. PATENT DOCUMENTS

| | | |
|---|---|---|
| 5,754,831 A | 5/1998 | Berman |
| 5,801,547 A | 9/1998 | Kean |
| 5,838,583 A | 11/1998 | Varadarajan et al. |
| 5,859,782 A | 1/1999 | Scepanovic et al. |
| 5,877,965 A | 3/1999 | Hieter et al. |
| 6,449,756 B1 | 9/2002 | Malik et al. |
| 6,467,074 B1 | 10/2002 | Katsioulas et al. |
| 6,557,145 B2 | 4/2003 | Boyle et al. |
| 6,625,797 B1 | 9/2003 | Edwards et al. |
| 6,637,016 B1 | 10/2003 | Gasanov et al. |
| 6,757,878 B2 | 6/2004 | Srinivasan et al. |
| 6,789,248 B1 | 9/2004 | Lu et al. |
| 7,178,120 B2 | 2/2007 | Hieter et al. |
| 7,322,018 B2 | 1/2008 | Rast et al. |
| 7,409,518 B2 | 8/2008 | Shmueli et al. |
| 7,581,197 B2 | 8/2009 | Arunachalam |
| 7,581,201 B2 | 8/2009 | Kazda et al. |
| 7,669,160 B2 | 2/2010 | Furnish et al. |
| 8,079,005 B2 | 12/2011 | Lai et al. |
| 8,245,236 B2 | 8/2012 | Brenner et al. |
| 8,248,401 B2 * | 8/2012 | Fowler .................... G06T 15/06 345/418 |
| 8,296,120 B2 | 10/2012 | Phillips et al. |
| 8,370,791 B2 | 2/2013 | Ogami et al. |
| 8,453,093 B2 | 5/2013 | Kim et al. |
| 8,479,137 B2 | 7/2013 | Lo et al. |
| 8,756,540 B1 | 6/2014 | Baeckler et al. |
| 8,775,998 B2 | 7/2014 | Morimoto et al. |
| 8,806,404 B2 | 8/2014 | Huang et al. |
| 8,832,621 B1 | 9/2014 | Gennari et al. |
| 9,418,188 B1 | 8/2016 | Hathaway et al. |
| 9,436,791 B1 | 9/2016 | Hathaway et al. |
| 2012/0304142 A1 | 11/2012 | Morimoto et al. |
| 2013/0091482 A1 | 4/2013 | Carrion |
| 2016/0300006 A1 | 10/2016 | Hathaway et al. |
| 2017/0083641 A1 * | 3/2017 | Hathaway ........... G06F 17/5072 |

OTHER PUBLICATIONS

IBM Appendix P, list of patents and patent applications treated as related, Dec. 7, 2016, 2 pages.

* cited by examiner

OPTIMIZING PLACEMENT OF CIRCUIT RESOURCES USING A GLOBALLY ACCESSIBLE PLACEMENT MEMORY

BACKGROUND OF THE INVENTION

The present invention relates generally to designing electronic circuits such as integrated circuits, and more particularly to optimizing placement of circuit resources.

Modern integrated circuits often have millions of circuit elements (i.e., resources) such as gates, latches, and drivers in addition to scores of I/O pins. Each of these circuit elements must be placed and electrically connected to other circuit elements, or to I/O pins, via wires (a.k.a. traces). The process of determining the connection path for the circuit wires is referred to as routing.

An initial timing analysis for an un-routed circuit may assume an optimal routing, such as a 'Steiner' routing, for each path in the circuit based on using horizontal and vertical routing channels to connect initially placed circuit elements. The initial timing analysis may compute a slack for each path in the circuit that is the difference of a desired arrival time (which may include a timing margin) and the estimated arrival time. A positive slack indicates that the arrival time at a node can be increased without affecting the overall delay of the circuit. Conversely, a negative slack indicates that a signal path is too slow, and the signal path must be sped up.

Optimization of an integrated circuit to meet design specifications often requires speeding up signal paths that have negative slack. In addition to timing improvement, placement related optimizations may be done to improve power, decrease congestion, and decrease consumed area. Typically, performing such optimizations requires resizing and/or moving various circuit elements to achieve the desired objectives. Such optimizations may be conducted during both the placement and routing phases of circuit design. With millions of circuit elements involved, such optimizations can be extremely time consuming.

SUMMARY

A method, executed by one or more processors, for optimizing placement of a logic network, includes partitioning a logic network comprising a set of logic elements into a set of logic partitions, launching a set of placement optimization threads that correspond to the logic partitions, allocating memory that is accessible to the placement optimization threads to provide a globally accessible placement memory, reserving a placement location for at least a portion of the plurality of logic elements via the globally accessible placement memory. Each placement optimization thread may be configured to conduct the operations of determining a desired location for a logic element, reserving a set of potential locations for the logic element that are proximate to the desired location, determining a best location from the set of potential locations, and placing the logic element at the best location. Each placement optimization thread may also be configured to conduct the operation of releasing each of the potential locations that are not the best location. A corresponding computer program product and computer system are also disclosed herein.

DETAILED DESCRIPTION

The embodiments disclosed herein enable multithreaded placement optimization including simultaneous logic and placement optimization. It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Placement optimizations may be extremely time consuming. One approach to improving placement optimization, illustrated in FIG. 1A, involves partitioning a circuit (e.g. a logic network) corresponding to an integrated circuit 100 into spatially disjoint sub-circuits 110 and assigning each sub-circuit 110 to a thread. Various circuit elements 120 are placed by the corresponding thread within a (typically rectangular) region allocated exclusively to the particular sub-circuit 110. In some situations, the sub-circuits 110 may be further subdivided into a hierarchy of circuit elements that are each spatially disjoint. Although the circuit elements 120 depicted in FIG. 1A (as well as FIG. 1B) are essentially identical is size, actual circuit elements may vary widely in size.

Figure 1A:
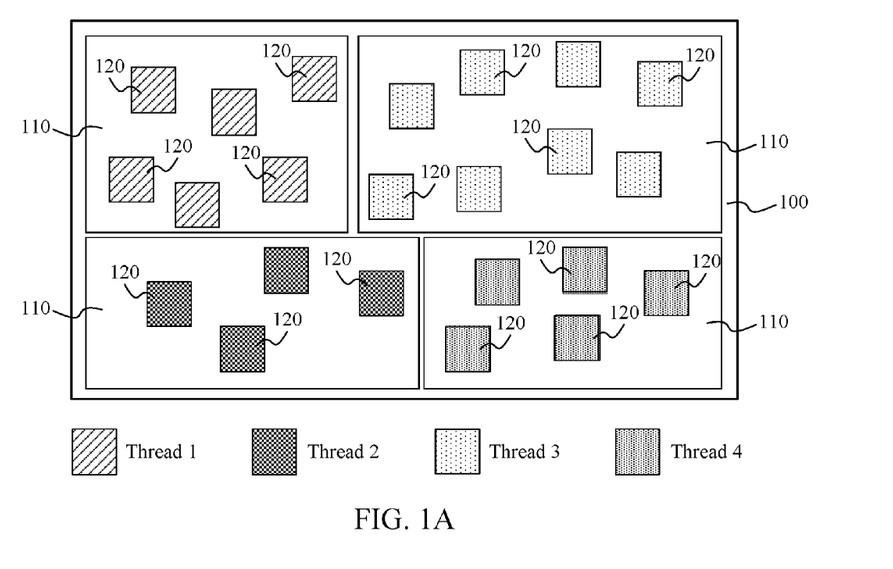
FIG. 1A is a placement map that illustrates one possible approach to placement partitioning.

While it is preferable to have all of the circuit elements at the lowest level of the circuit hierarchy be spatially disjoint, it is not preferable to have the higher levels of a hierarchy be spatially disjoint. For example, two sub-circuits 110 may drive output pins that are in close proximity. The requirement that the sub-circuits be spatially disjoint requires that each sub-circuit 110 compete for space that is proximate to the output pins and sufficiently large to contain the entire sub-circuit. As a result, spatially disjoint sub-circuit placements are typically highly sub-optimal and require that extra space be allocated to the sub-circuits 110 to facilitate adjustments in placement.

Figure 1B:
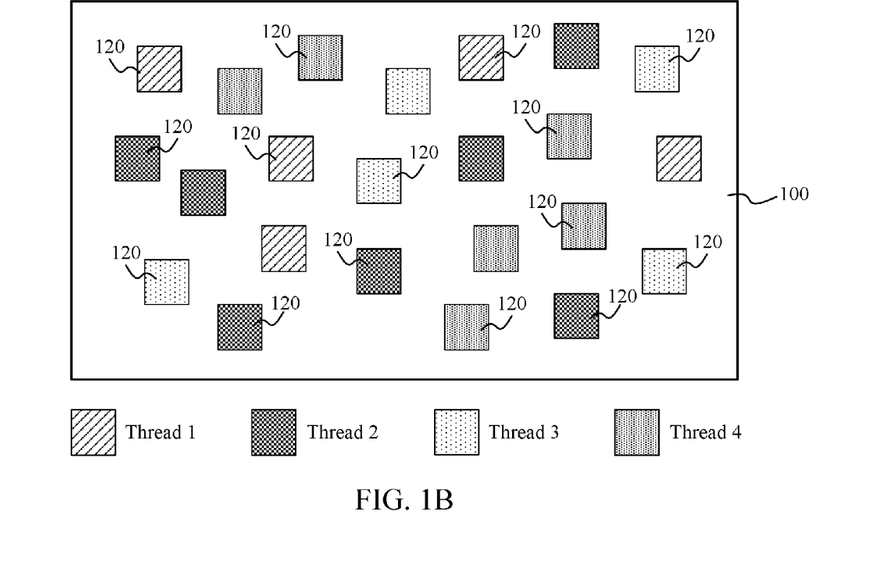
FIG. 1B is a placement map that illustrates a placement partitioning method in accordance with at least one embodiment of the present invention.

In contrast to the requirement for spatially disjoint sub-circuits, the present invention enables each placement thread to place the circuit elements 120 at any available area on the chip (as illustrated in FIG. 1B) and essentially consume only that space that is required for placement of the assigned circuit elements 120. In other words, rather than partitioning the integrated circuit into spatially disjoint regions that are large enough to encompass the entire sub-circuit 110, spatial regions that match the particular size of each circuit element 120, which may be located at any open area of the integrated circuit, may be acquired by each placement thread.

Figure 2A:
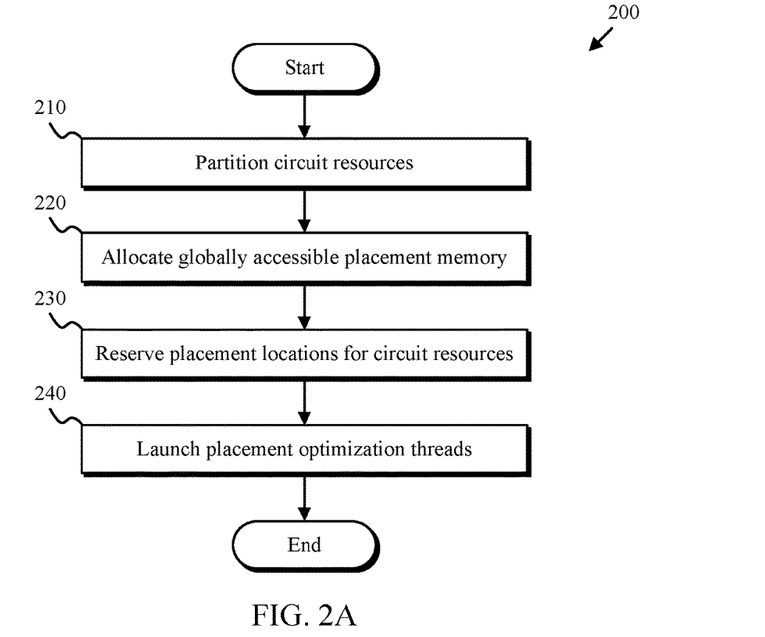
FIG. 2A is a flowchart depicting a placement initialization method in accordance with at least one embodiment of the present invention.

FIG. 2A is a flowchart depicting a placement initialization method 200 in accordance with at least one embodiment of the present invention. As depicted, the placement initialization method 200 includes partitioning (210) circuit resources, allocating (220) a globally accessible placement memory, reserving (230) placement locations for the circuit resources, and launching (240) a set of optimization threads. The placement initialization method 200 enables execution of a placement optimization method by multiple, potentially concurrent, optimization threads.

Partitioning (210) circuit resources may include partitioning a circuit such as a logic network into multiple sub-circuits (e.g. logic partitions). The partitioning may cluster circuit resources such as logic elements into groups or partitions that have a high number of internal connections (i.e., connections within a partition) and a relatively low number of external connections (i.e., connections to other partitions and IO pins).

Allocating (220) a globally accessible placement memory may include allocating sufficient memory to reserve each discrete location on a chip. For example, a chip may be divided into a discrete grid of locations that are of a fixed size. The globally accessible placement memory may store one or more arrays or tables that enable the reservation of specific grid elements. The granularity of the grid may be selected to be less than the minimum size of a circuit resource.

Reserving (230) placement locations for the circuit resources may include reserving an appropriate area for at least a portion of the circuit resources. Reserving an appropriate area may require reserving a contiguous set of locations corresponding to an area that is capable of encompassing the circuit resource. The reserved placement locations may correspond to an initial placement for the circuit resources. In some embodiments, only timing critical circuit elements are included in the initial placement.

Launching (240) a set of optimization threads may include launching one optimization thread for each resource partition. For example, in some computing environments a system call (e.g., pthread_create) with appropriate parameters can be used to launch an optimization thread for a resource partition.

Figure 2B:
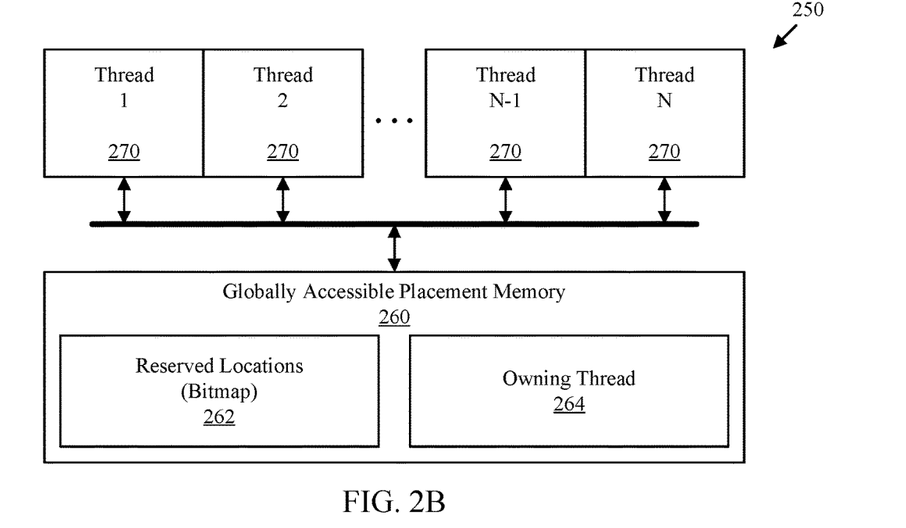
FIG. 2B is a block diagram of a multithreaded placement system in accordance with at least one embodiment of the present invention.

FIG. 2B is a block diagram of a multithreaded placement system 250 in accordance with the present invention. As depicted, the multithreaded placement system 250 includes a globally accessible placement memory 260 and a set of optimization threads 270. Each optimization thread 270 may correspond to a partition (e.g., a logic partition). The multithreaded placement system 250 may be initialized by the placement initialization method 200.

The globally accessible placement memory 260 enables reservation of specific areas of a chip or the like, by each of the optimization threads 270. For example, the optimization threads 270 may reserve a contiguous area on the chip that encompasses a circuit resource via a reserved locations array 262 and an owning thread array 264.

The reserved locations array 262 indicates which locations have been reserved. The reserved locations array 262 may be used to find vacant areas on the chip that are possible candidates for reservation. In the depicted embodiment, the reserved locations array 262 is a bitmap which enables searching for vacant regions in which a specific shape can fit (e.g., by searching for a space within the reserved locations array 262 in which a bit pattern corresponding to the specific shape can fit). In some embodiments, each optimization thread 270 maintains the location of circuit elements (resources) assigned to their partition within a memory array local to the thread. Consequently, a location change for a resource to a location that is already reserved by the optimization thread can be made without accessing the reserved locations array 262.

The owning thread array 264 indicates the specific optimization thread 270 that owns each location (if any). For example, each optimization thread 270 may be assigned a unique thread ID which is stored in the appropriate entries of the owning thread array 264.

Each of the optimization threads 270 may read from, and write to, the globally accessible placement memory 260. In some embodiments, atomic test and set operations are used for all write operations to the globally accessible placement memory 260. The use of atomic test and set operations for write operations prevents two threads from reserving the same location. For example, a discrete location on the chip may be reserved by testing an entry in the owning thread array 264 to verify that no thread owns a specific location, and then setting the entry to the thread ID assigned to the optimization thread.

In some embodiments, a lock (e.g., a system call) is used to provide exclusive access to all, or a portion of, the globally accessible placement memory 260 by a particular optimization thread 270. Exclusive access enables the reservation of multiple locations without possible interference from other optimization threads 270. In some embodiments, writing to the reserved locations array 262 requires exclusive access in that multiple bits (e.g., within a byte or word) are written simultaneously which may be owned by different optimization threads. Consequently, writing to the reserved locations array 262 may require locking a unit of memory such as a word or byte, reading the current value stored therein, changing the appropriate bit(s), updating the unit of memory, and unlocking the unit of memory.

Figure 3:
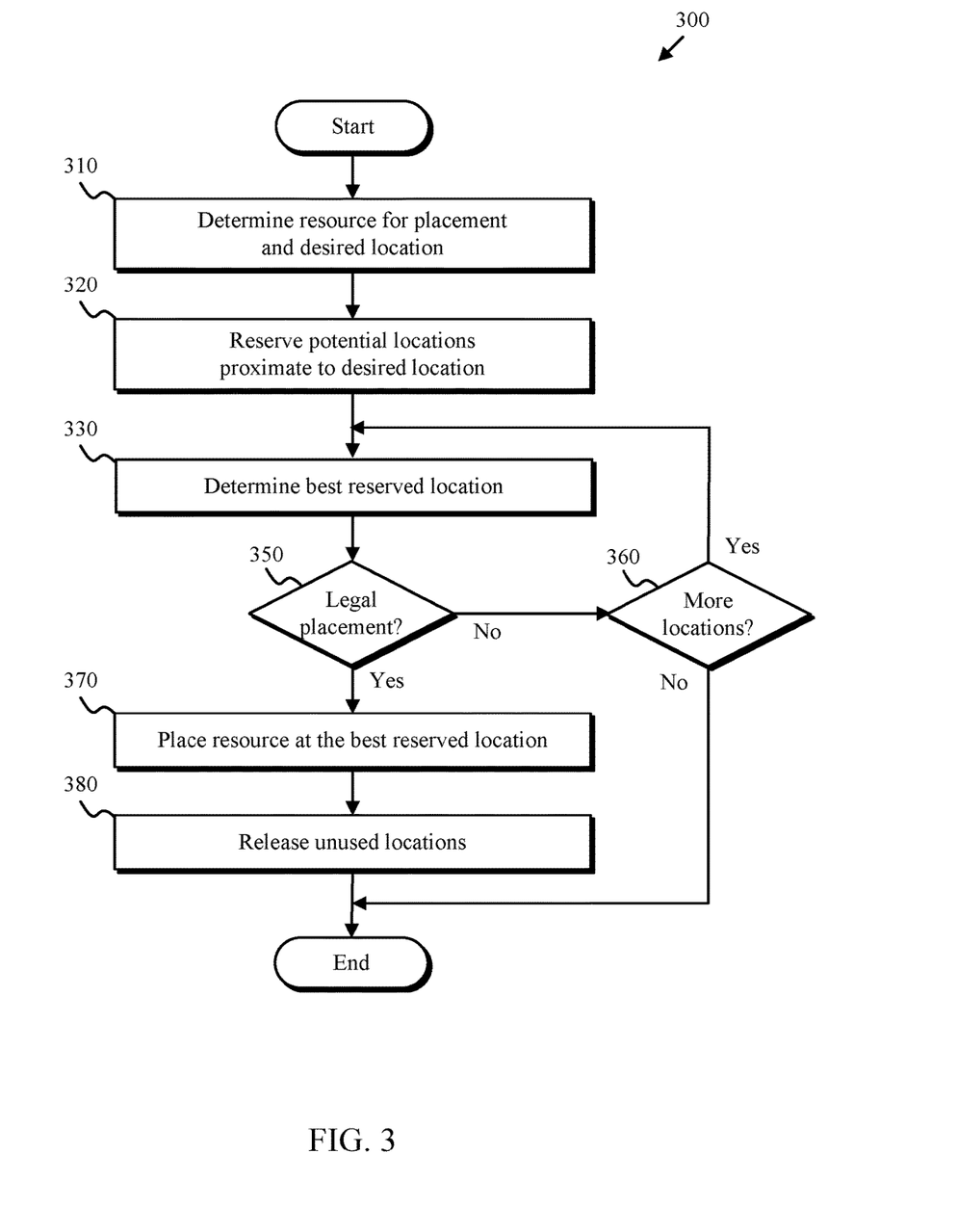
FIG. 3 is a flowchart depicting a first placement optimization method in accordance with at least one embodiment of the present invention.

FIG. 3 is a flowchart depicting a placement optimization method 300 in accordance with at least one embodiment of the present invention. As depicted, the placement optimization method 300 includes determining (310) a resource, reserving (320) potential locations, determining (330) a best reserved location, determining (350) if the placement is legal, determining (360) whether additional locations should be tested, placing (370) the resource, and releasing (380) unused locations. The placement optimization method 300 may be executed by each optimization thread 270 and may reduce the number of locks placed on the globally accessible placement memory 260 by a particular optimization thread 270.

Determining (310) a resource may include selecting a placed resource or an unplaced resource. For example, a placed resource associated with a signal path having negative slack may be selected in order to reduce or eliminate the negative slack.

Reserving (320) potential locations may include searching near a desired location to find multiple areas that are sufficiently large to encompass the selected resource. The search may be conducted by reading values in the reserved locations array 262 or the like. Since only read operations are required to read the information in the reserved locations array 262, multiple optimization threads 270 may concurrently search for available areas without requiring locks, or test and set operations, and without causing conflicts or race conditions. If a potential location is found, a lock and unlock sequence or a test and set operation may be conducted to reserve the location (as well as any adjacent locations that are required to encompass the resource) via the reserved locations array 262 and the owning thread array 264. In some embodiments, multiple potential locations are reserved with a single lock and unlock sequence.

Determining (330) a best reserved location may include evaluating the reserved potential locations to determine which location is best. Metrics used to evaluate the best location may include circuit slack, electrical characteristics such as capacitance and slew, circuit area, power consumption, design rule constraints (e.g., minimum transistor spacing), circuit congestion, and the like.

Determining (350) if the placement is legal may include verifying that the placed resource is compatible with adjacent resources and does not violate various physical and electrical restrictions such as placement and wiring pitch, pin-accessibility, wiring restrictions, pitch restrictions, circuit library constraints/preferences (e.g., circuit orientation for compatibility with predefined signal and power-ground distribution), and the like. If the placement is legal, the method advances to placing (370) the resource. If the placement is not legal, the method advances to determining (360) whether additional locations should be tested.

Determining (360) whether additional locations should be tested may include assessing whether other reserved locations are available for selection as the best reserve location. If other reserved locations are not available the method terminates unsuccessfully. If other reserved locations are available the method loops to the determining operation 330.

Placing (370) the resource may include updating information that indicates the location of the resource. In some embodiments, the actual location of each specific resource is stored in the globally accessible placement memory 260 (e.g., a resource location array). In other embodiments, the actual location of each specific resource is kept private to each optimization thread while the allocation of locations is available to each optimization thread via the globally accessible placement memory 260.

Releasing (380) unused locations may include accessing the globally accessible placement memory 260 to clear entries within the reserved locations array 262 and the owning thread array 264. A lock and unlock sequence, or one or more test and set operations, may be used to clear the entries. In some embodiments, some or all of the unused locations may be retained for use by the optimization thread as potential locations for other circuit resources. Consequently, in some situations the releasing operation 380 may be omitted. Subsequent to the releasing operation 380, the method successfully terminates.

Figure 4:
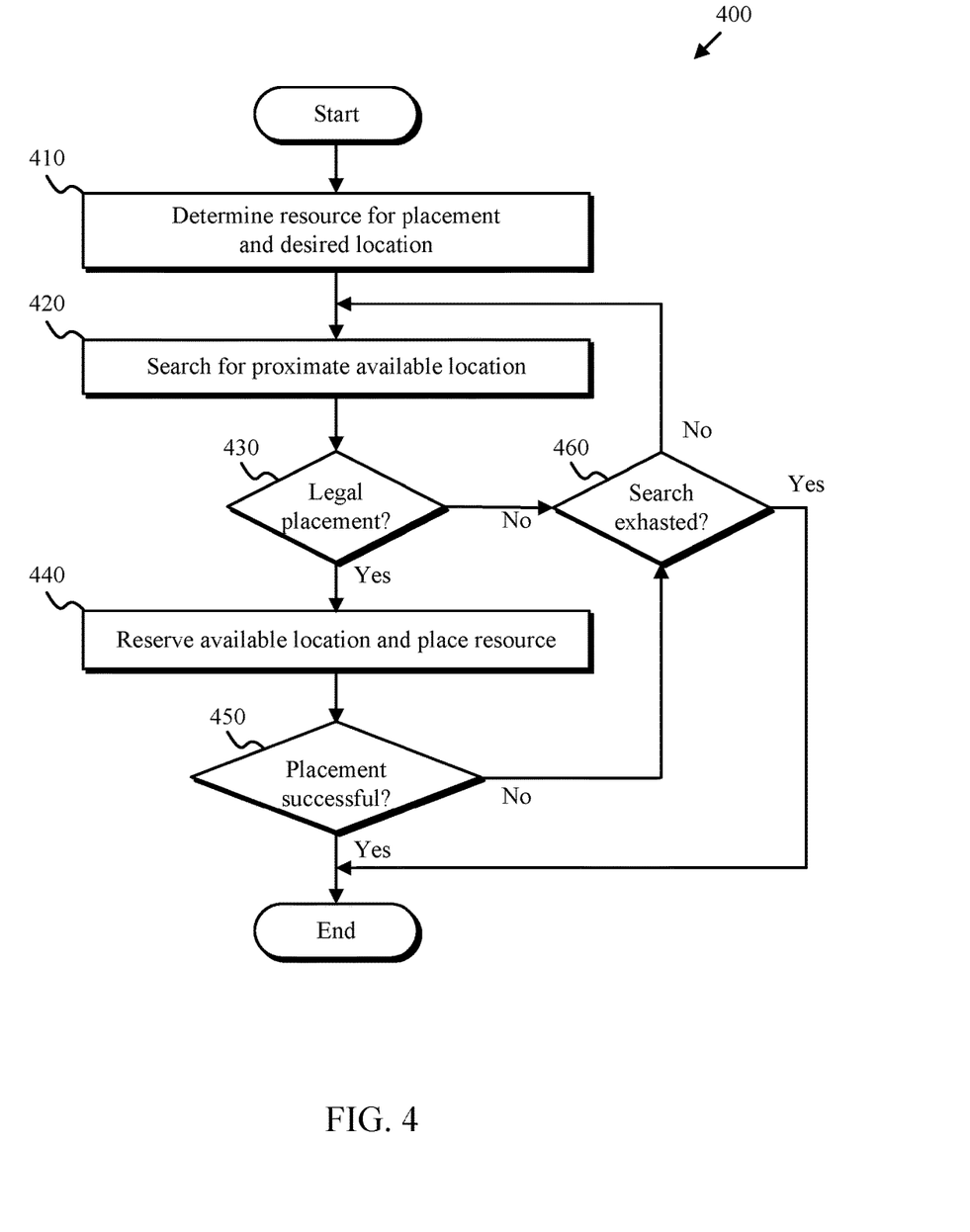
FIG. 4 is a flowchart depicting a second placement optimization method in accordance with at least one embodiment of the present invention.

FIG. 4 is a flowchart depicting a placement optimization method 400 in accordance with at least one embodiment of the present invention. As depicted, the placement optimization method 400 includes determining (410) a resource, searching (420) for an available location, determining (430) if a placement at the available location is legal, reserving (440) the available location and placing the resource, determining (450) if the placement was successful, and determining (460) if the search is exhausted. The placement optimization method 400 may be executed by each optimization thread 270 and is an alternative to the placement optimization method 300. In contrast the method 300, the placement optimization method 400 defers the reservation of a location until the legality of the placement has been determined. Deferring the reservation of a location may reduce the number of locks (or the like) that must be applied to the globally accessible placement memory 260 (or the like).

Similar to the determining operation 310, determining (410) a resource may include selecting a placed resource or an unplaced resource. Searching (420) for an available location may include searching within a selected distance of a desired location to find an area that is sufficiently large to encompass the selected resource. In one embodiment, searching is done in a spiral pattern. The search may be conducted by reading values in the reserved locations array 262 or the like. Since only read operations are involved for the information in the reserved locations array 262, multiple optimization threads 270 may concurrently conduct the search operation 420 without requiring locks, or test and set operations, and without causing conflicts or race conditions.

Determining (430) if a placement at the available location is legal may include conducting various tests to determine if the location is suitable for the resource. In some embodiments, the determining operation 430 is substantially similar to the determining operation 350 shown in FIG. 3. If a location is not found or the location is not suitable, the method proceeds to determining (460) if the search is exhausted. If a qualified location was found the method proceeds by placing (440) the resource.

Reserving (440) the available location and placing the resource may include reserving the selected location as well as any adjacent locations that are required to encompass the resource. A lock and unlock sequence, or a test and set operation, may be conducted to reserve the location(s) via the globally accessible placement memory 260. Placing the resource may include updating information that indicates the location of the resource. Placing the resource may effectively move the resource from a previous location.

Determining (450) if the placement was successful may include determining if the globally accessible placement memory 260 was properly updated. If the placement was successful, the method terminates successfully. If the placement was not successful (e.g., another optimization thread reserved the location since the location was selected), the method proceeds by determining (460) if the search is exhausted.

Determining (460) if the search is exhausted may include determining if a next position in a search pattern is within range. If the search is exhausted, the method terminates unsuccessfully. If the search is not exhausted the method loops to the searching operation 420.

One of skill in the art will appreciate the flexibility and utility provided by various embodiments disclosed herein. For example, a logic network comprising a set of interconnected logic elements can be partitioned into a number of logic partitions. An initial placement may be determined for at least a portion of the logic elements. The initial placement locations may be reserved in a globally accessible placement memory. A set of placement optimization threads may be launched and each thread assigned a particular logic partition. The placement optimization threads may function collaborative via the globally accessible placement memory to optimize the placement of each logic elements.

For example, each placement optimization thread may determine a desired location for a logic element within the logic partition assigned to that thread, reserve (via the globally accessible placement memory) multiple potential locations for the logic element that are proximate to the desired location, determining a best location from the plurality of potential locations, and placing the logic element at the best location.

The foregoing search and place sequences (e.g., within the placement optimization methods 300 and 400) may be done in conjunction with moving, resizing, adding (e.g., for buffering), and substituting a logic element. In some embodiments, a network logic optimization process (not disclosed herein) may be conducted in conjunction with the methods disclosed herein in order to simultaneously optimize the selection and placement of logic elements.

Figure 5:
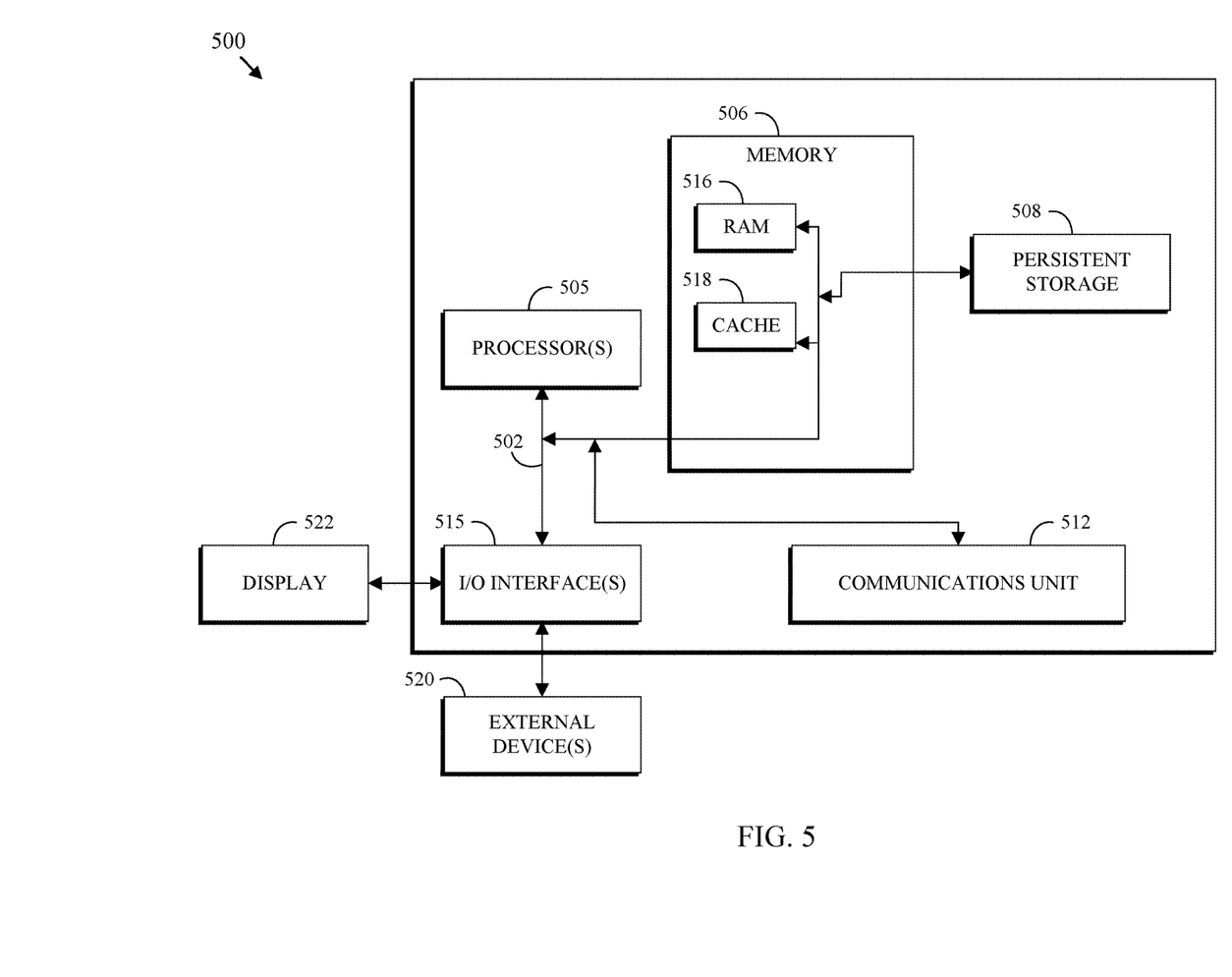
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer system comprising:
   one or more processors;
   one or more computer readable storage media and program instructions stored on the one or more computer readable storage media, the program instructions comprising instructions to execute a method comprising:
   partitioning a logic network comprising a plurality of logic elements into a plurality of logic partitions;
   launching a plurality of placement optimization threads that correspond to the plurality of logic partitions;
   allocating memory that is accessible to the plurality of placement optimization threads to provide a globally accessible placement memory;
   reserving a placement location for at least a portion of the plurality of logic elements via the globally accessible placement memory; and
   wherein each placement optimization thread of the plurality of placement optimization threads is configured to conduct the operations of:
   determining a desired location for a logic element of the plurality of logic elements, wherein the logic element is within a logic partition that corresponds to the placement optimization thread, reserving, via the globally accessible placement memory, a plurality of potential locations for the logic element that are proximate to the desired location, determining a best location from the plurality of potential locations, releasing each of the plurality of potential locations that are not the best location, placing the logic element at the best location, and wherein reserving a potential location comprises locking at least a portion of the globally accessible placement memory, inserting a thread identifier within at least one entry of an owning thread array stored within the globally accessible placement memory, and inserting at least one bit within a reserved locations bitmap stored within the globally accessible placement memory, and unlocking the portion of the globally accessible placement memory that was locked to reserve the potential location.

\* \* \* \* \*